United States Patent [19]
Scholder

[11] Patent Number: 5,327,067
[45] Date of Patent: Jul. 5, 1994

[54] PORTABLE COMPUTER BATTERY CHARGING APPARATUS

[75] Inventor: Erica Scholder, Austin, Tex.

[73] Assignee: Dell USA, L.P., Austin, Tex.

[21] Appl. No.: 71,125

[22] Filed: Jun. 2, 1993

[51] Int. Cl.⁵ .......................................... H01M 10/46
[52] U.S. Cl. ........................................................ 320/2
[58] Field of Search .......................................... 320/2

[56] References Cited

U.S. PATENT DOCUMENTS

| | | | |
|---|---|---|---|
| 3,644,873 | 2/1972 | Dalton et al. | 320/2 X |
| 3,665,285 | 5/1972 | Mullersman et al. | 320/2 |
| 3,924,097 | 12/1975 | Knowles et al. | 320/2 X |
| 4,419,616 | 12/1983 | Baskins et al. | 320/2 |
| 4,963,812 | 10/1990 | Mischenko et al. | 320/2 |
| 5,052,943 | 10/1991 | Davis | 320/2 X |
| 5,229,701 | 7/1993 | Léman et al. | 320/2 |

OTHER PUBLICATIONS

Owner's Manual–Motorola Digital Personal Communicator Telephone, 1991 pp. 53–55.

Primary Examiner—R. J. Hickey
Attorney, Agent, or Firm—James W. Huffman

[57] ABSTRACT

A portable computer battery charger has a hollow housing which is supportable on a generally horizontal surface and has a power wiring board horizontally disposed within a bottom portion thereof beneath a depending pair of vertically tilted, open-topped wells formed in the top wall of the housing. The power wiring board is adapted to receive electrical charging energy from a source thereof, and has a plurality of resilient metal clip members electrically connected thereto and projecting upwardly through bottom end openings in the wells. To charge a pair of elongated portable computer batteries charging ends thereof are placed in the wells which support the batteries in a vertically tilted orientation in which major longitudinal portions of the batteries project upwardly beyond the top side of the housing. Electrical contact areas on the bottom ends of the batteries contact and deflect the clip members, and receive electrical charging energy therethrough, and the weights of the tilted batteries cause their lower end portions to be brought into forcible frictional contact with interior side surface portions of the wells to thereby positionally stabilize the charging batteries relative to the housing.

14 Claims, 2 Drawing Sheets

PORTABLE COMPUTER BATTERY CHARGING APPARATUS

BACKGROUND OF THE INVENTION

The present invention generally relates to computer apparatus, and more particularly relates to apparatus for charging portable computer batteries.

Portable computers, such as the increasingly popular notebook computer, are typically provided with elongated batteries removably disposed in a battery storage compartment within the computer. Under conventional practice, a portable computer battery is recharged by removing it from the battery storage compartment in its associated computer, placing the removed battery in a horizontal orientation entirely within the interior the outer housing of a battery charger through a front access opening therein, and then closing a front access door on the housing to engage the battery and force its charging contacts against corresponding contacts on a power wiring board vertically disposed within the back of the housing.

This conventional computer battery charging apparatus presents several problems, limitations and disadvantages. For example, because the battery being charged is completely enclosed within the charger, it is often necessary to provide auxiliary cooling to prevent charging heat from damaging the enclosed battery and/or the charging circuitry. Moreover, since the charger must be sized to completely receive one or more computer batteries, the charger tends to be rather heavy and bulky, thereby undesirably decreasing its portability. Additionally, in this conventional full enclosure type of computer battery charger access to the internal charging circuitry tends to be relatively difficult, and the structure of the charger is often relatively complex, thereby making it fairly expensive to manufacture.

It can be readily seen from the foregoing that it would be desirable to provide improved portable battery charging apparatus that eliminates, or at least substantially minimizes the above-mentioned problems, limitations and disadvantages commonly associated with battery chargers of the general type described above. It is accordingly an object of the present invention to provide such improved portable computer battery charging apparatus.

SUMMARY OF THE INVENTION

In carrying out principles of the present invention, in accordance with a preferred embodiment thereof, a specially designed battery charger is provided for charging an elongated portable computer battery of the type having a contact area on one end thereof through which electrical charging energy may be transmitted to the battery.

The charger comprises a battery support structure having a bottom side supportable on a generally horizontal surface, and a top wall upwardly spaced apart from the bottom side. An open-topped well structure depends from the top wall of the support structure and has a generally vertically oriented first side wall.

The well structure is configured and oriented to removably receive the charging end portion of the battery and support the battery in a vertically tilted orientation. In this tilted orientation a substantial longitudinal portion of the battery extends upwardly beyond the top wall of the support structure, and the weight of the battery maintains its received charging end portion in forcible frictional engagement with the first side wall of the well structure to thereby positionally stabilize the battery relative to the support structure.

Charging circuit means, carried by the battery support structure, are operative to receive electrical charging energy from a source thereof and transmit the received charging energy to the battery, through its contact area, in response to receipt of the charging end portion of the battery in the well structure.

The charging circuit means preferably comprise a power wiring board horizontally disposed within the support structure, beneath the well structure, and having a resilient metal clip member electrically connected to the board circuitry and projecting upwardly through a bottom end wall opening of the well structure and positioned to be engaged and downwardly deflected by the battery charging contact area when the charging end of the battery is placed within the well structure.

According to a feature of the present invention the well structure has a side wall section that is spaced apart from and opposes the first well structure side wall and acts as a stop which engages the received battery charging end portion in a manner limiting the vertical tilt angle of the battery to a relatively small angle, representatively about 15°. The side wall section preferably comprises a generally vertical second side wall having a horizontally spaced plurality of webs projecting therefrom toward the first well side wall and having outer side edges that face the first side wall and are generally parallel therewith. Preferably these outer web side edges are upwardly sloped at a slight angle relative to the first well structure to facilitate the insertion into the well structure of the charging end portion of the battery.

DETAILED DESCRIPTION

Figure 1:
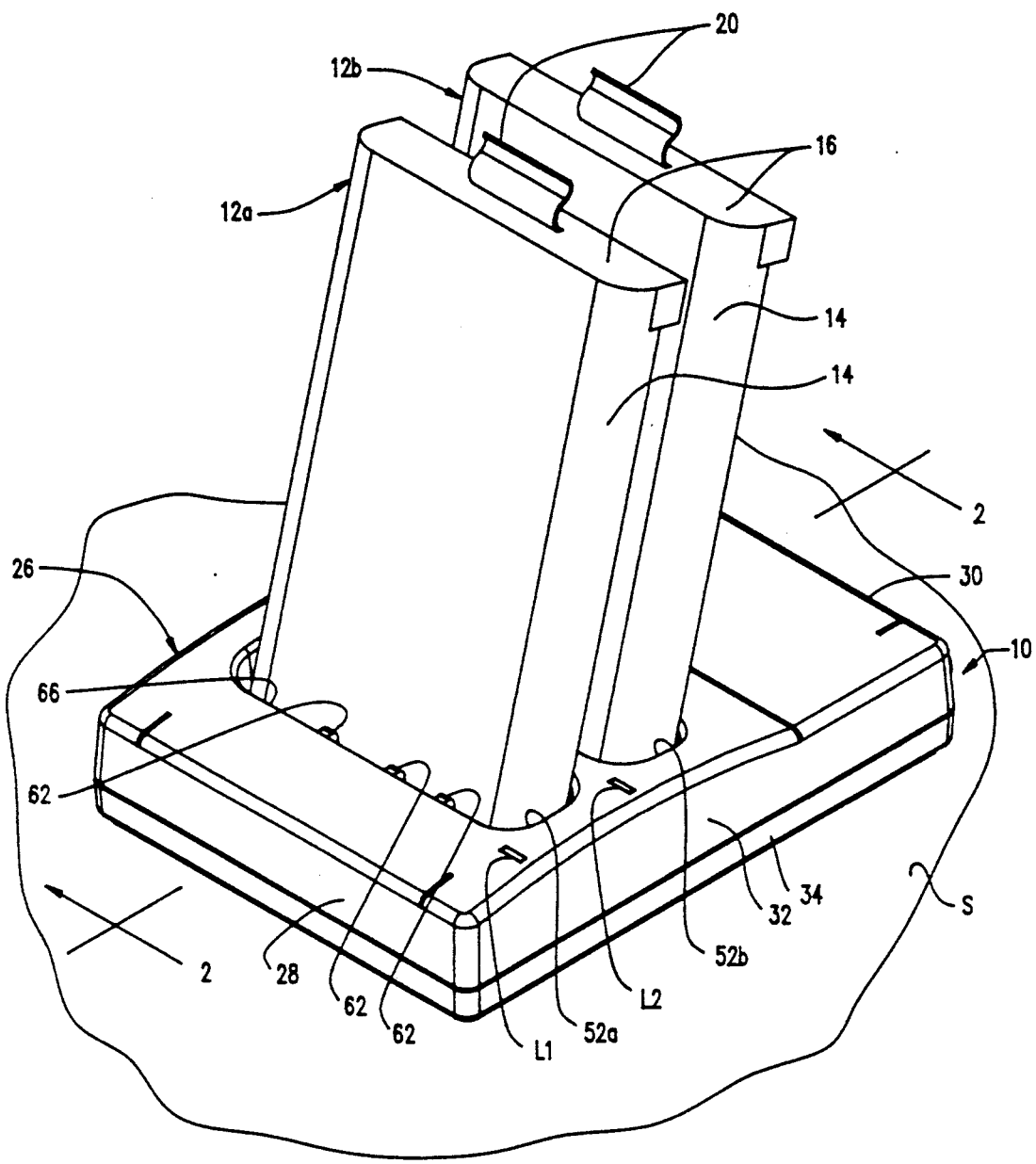
FIG. 1 is a perspective view of a specially designed battery charger embodying principles of the present invention and being used to charge a representative pair of portable computer batteries.

Perspectively illustrated in FIG. 1 is a specially designed compact battery charger 10 that embodies principles of the present invention and is shown charging a representative pair of portable computer batteries 12a and 12b of conventional design and construction. Each of the batteries 12a,12b has an elongated, generally rectangular configuration, is encased in a plastic housing 14 having top and bottom ends 16 and 18 (see FIGS. 2 and 3 also), and is removably insertable bottom end first into a battery storage compartment of a portable computer (not shown) such as a notebook computer.

Figure 2:
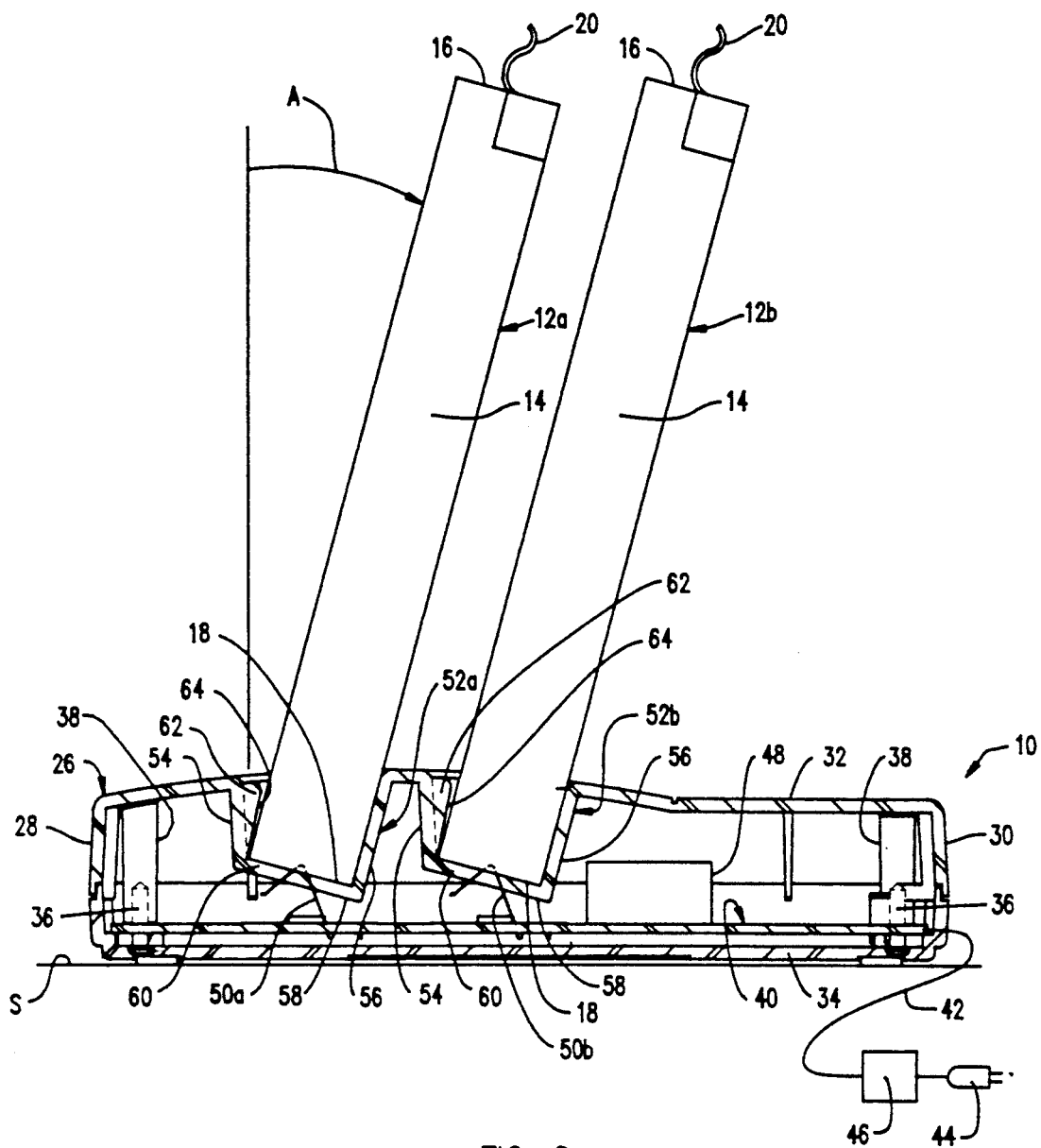
FIG. 2 is an enlarged scale cross-sectional view through the battery charger taken along line 2—2 of FIG. 1, with the batteries being shown in elevation.
Figure 3:
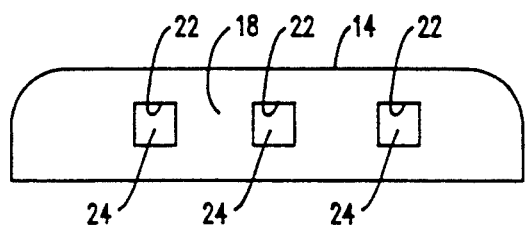
FIG. 3 is a simplified bottom end elevational view of one of the batteries.

Flexible pull straps 20 are secured to the top ends 16 of the batteries and facilitate the removal of each battery from its associated storage compartment. As best illustrated in FIG. 2, openings 22 (representatively three in number) are formed in each bottom housing end 18 (its charging end) and expose in the associated battery three underlying metal battery contact areas 24. Contact areas 24 are used to electrically connect the battery to the computer circuitry when the battery is operatively inserted into the battery storage compartment of its associated computer, and are also used in conjunction with the charging of the battery, in a manner subsequently described herein, when the battery is removed from its computer.

Turning now to FIGS. 1 and 2, the charger 10 is shown resting on a suitable horizontal support surface S and includes a battery support structure in the form of a hollow plastic housing 26 having a front end 28 and a rear end 30. Housing 26 has a generally rectangular configuration which is elongated in a front-to-rear direction, has a relatively shallow depth substantially less than the length of either of the batteries 12a and 12b, and is formed from hollow top and bottom sections 32 and 34. The top and bottom housing sections 32 and 34 are removably intersecured by a plurality of screws 36 extending upwardly through the bottom section 34 and threaded into depending cylindrical bosses 38 molded integrally with the top section 32.

A power wiring board (PWB) 40 (see FIG. 2) is suitably supported in a horizontal orientation within the bottom housing section 34 and is connected to a nearby 110V AC electrical outlet (not shown) by means of a power cord 42 having a connection plug 44 at its outer end and an AC adapter 46 installed therein. The power wiring board 40 has installed on its top side various interconnected power and control components, such as the representatively illustrated component 48, and functions to receive electrical power through the cord 42 and use the received power to charge the batteries 12a,12b.

To transmit the charging power from the PWB 40 to the batteries as later described herein, two spaced series of three metal contact clips 50a,50b are operatively connected to the board circuitry and project upwardly from the top side of the PWB 40. Only one clip in each of the clip series 50a,50b is visible in FIG. 2, and the clip spacing in each series of clips is identical to the spacing of the bottom end housing openings 22 on the batteries (see FIG. 3).

Depending from the top side of the top charger housing section 32, and spaced apart in a front-to-rear direction thereon, are a pair of open-topped battery receiving wells 52a,52b each having a cross-section generally complementary to that of a lower end portion of each of the batteries 14a,14b but sized to relatively loosely receive lower end portions of the batteries as later described herein. LED indicating lights $L_a$ and $L_2$ mounted on the top wall of the housing 26, and operatively connected to the power wiring board circuitry, provide a visual indication of the charging status of the batteries received in the wells.

According to a key feature of the present invention, each well 52a,52b has a generally vertically extending front side wall 54, a rear side wall 56 rearwardly sloped relative to the front side wall at a relatively small angle A (representatively about 15°), and a bottom end wall 58.

Each of the bottom end walls 58 has three spaced apart openings 60 formed therein. The contact clips 50a extend upwardly into the interior of the well 52a through its bottom end wall openings 60, and the contact clips 50b extend upwardly into the interior of the well 52b through its bottom end wall openings 60. For purposes later described, each of the well front side walls 54 has formed on its rear side surface three spaced apart, rearwardly projecting web portions 62 each having a rear side edge surface 64. The rear side edge surfaces 64 are generally parallel to the rear side walls 56 of the wells 52a,52b but are very slightly sloped in forward and upward directions relative thereto.

To charge the batteries 12a and 12b, with the plug 44 inserted into an AC outlet, the batteries are simply inserted bottom or charging end first into the charger wells 52a,52b as illustrated in FIGS. 1 and 2. The operative insertion of the batteries into the wells is facilitated by the slight sloping of the web side edges 64 relative to the rear well side walls 56 described above. Upon downward entry of the batteries 12a,12b into the wells 52a,52b the upper ends of the contact clips 50a,50b enter the bottom jacket end openings 22 of their associated batteries and engage their metal contact areas 24 (see FIG. 3). The weights of the longitudinally inserted batteries downwardly deflect the contact clips in a manner maintaining them in firm engagement with their associated battery contact areas 24.

As illustrated in FIGS. 1 and 2, the inserted batteries 12a,12b automatically assume their indicated rearwardly tilted orientations and lean rearwardly at the angle A of approximately 15°. Due to this rearward tilting of the inserted batteries, their weights cause rear sides of their lower end portions within the wells to forcibly and frictionally engage the rear well side walls 56 (with the webs 62 acting as stops that engage front side portions of the received battery ends and prevent further rearward tilting of the batteries) to thereby further stabilize the inserted batteries relative to the charger 10. Accordingly, despite the fact that the batteries are rather loosely received within the charger wells 52a and 52b, and are thus easily removable therefrom, the batteries in their illustrated tilted charging orientations are frictionally gripped by the charger without the use of any other retention mechanisms such as clips, brackets and the like.

Compared to conventional full enclosure types of portable computer battery chargers, it should be noted that the charger 10 covers only a very small portion of the batteries 12a and 12b while they are being charged. This feature of the charger 10 readily permits charging heat to be rapidly dissipated to ambient, thereby substantially eliminating the possibility that the batteries and/or the charging circuitry will be heat-damaged during the charging process. In this regard it should be noted that the webs 62 function to separate the charging ends of the batteries from the front well walls 54, thereby maintaining a gap 66 (see FIG. 1) between each front well wall 54 and the front side of the bottom charging end of its associated battery. These gaps advantageously expose substantial portions of the well-received battery charging ends to ambient cooling air.

Moreover, since the charger 10 need not be configured to enclose the batteries, it is quite compact and light weight, thereby desirably increasing its portability. The simple construction of the housing 26 provides easy and rapid access to the power wiring board for inspection and repair, and there are no moving parts incorporated in the charger.

As described above, the configuration of the charger 10, with its tilted wells 52a and 52b, automatically uses the weights of the batteries to create both the contact force between the clips 50 and the batteries and the frictional gripping force exerted on the batteries by the housing 26 when the batteries are placed in the wells. Additionally, of course, the drop-in battery placement of the charger 10 makes it very simple to use.

The charger 10 has been representatively shown as being configured to receive and charge two portable computer batteries. It will be readily appreciated, however, that it could be alternatively configured to receive and charge one battery, or more than two batteries, if desired.

The foregoing detailed description is to be clearly understood as being given by way of illustration and example only, the spirit and scope of the present invention being limited solely by the appended claims.

What is claimed is:

1. Apparatus for charging a portable computer battery having a first end portion, and a second end portion longitudinally spaced apart from said first end portion and having disposed thereon a contact area through which electrical charging energy may be transmitted to the battery, said apparatus comprising:
    a battery support structure having a bottom side supportable on a generally horizontal surface, and a top wall upwardly spaced apart from said bottom side;
    an open-topped well structure depending from said top wall and having a generally vertically oriented first side wall, said well structure being configured and oriented to removably receive the second end portion of the battery and support the battery in a vertically tilted orientation in which a substantial longitudinal portion of the battery extends upwardly beyond said top wall and the weight of the battery maintains its second end portion in forcible frictional engagement with said first side wall of said well structure; and
    charging circuit means, carried by said battery support structure, for receiving electrical charging energy from a source thereof and transmitting the received charging energy to the battery, through its contact area, in response to receipt of the second battery end portion in said well structure.

2. The apparatus of claim 1 wherein:
    said first side wall of said well structure is vertically tilted at a relatively small angle, and
    said well structure has a side wall section opposing said first side wall and positioned and configured to be engaged by the well-received second battery end portion and act as a stop to limit the vertical tilt of the battery.

3. The apparatus of claim 2 wherein said relatively small angle is approximately 15°.

4. The apparatus of claim 2 wherein said side wall section of said well structure includes:
    a second, vertically extending side wall, and
    a horizontally spaced plurality of webs formed on said second side wall and projecting therefrom toward said first side wall.

5. The apparatus of claim 4 wherein:
    said webs have inner side edge surfaces which are generally vertically oriented, angled relative to said second side wall, and generally parallel to said first side wall.

6. The apparatus of claim 5 wherein:
    said inner side edges of said webs are upwardly sloped away from said first side wall at a slight angle.

7. The apparatus of claim 1 wherein:
    said charging structure is a hollow housing having a top portion containing said top wall, and a bottom portion removably connected to said top portion, and
    said charging circuit means include a power wiring board horizontally disposed within said bottom housing portion in a downwardly spaced apart relationship with said well structure.

8. The apparatus of claim 7 wherein:
    said well structure has a bottom end wall with an opening therein positioned to be aligned with the battery contact area when the second battery end portion is operatively received in said well structure, and
    said charging circuit means further include a resiliently deflectable metal clip member electrically connected to said power wiring board and protruding upwardly through said bottom end wall opening into the interior of said well structure.

9. Apparatus for charging a portable computer battery having a first end portion, and a second end portion longitudinally spaced apart from said first end portion and having disposed thereon a contact area through which electrical charging energy may be transmitted to the battery, said apparatus comprising:
    a hollow housing supportable on a generally horizontal surface and having a top wall;
    open-topped well means depending from said top wall within the interior of said housing and having a generally vertically oriented interior side surface, said well means being operative to removably receive the second end portion of the battery and support the battery in a vertically tilted orientation in which a substantial longitudinal portion of the battery extends upwardly beyond said top wall with the weight of the battery maintaining its second end portion in forcible frictional engagement with said interior side surface of said well means, said well means further having a bottom end wall with an opening therein positioned to be aligned with the battery contact area when the second battery end portion is operatively received in said well means; and
    charging circuit means, carried by said housing, for receiving electrical charging energy from a source thereof and transmitting the received charging energy to the battery in response to receipt of the second battery end portion in said well means, said charging means including an electrically conductive portion extending upwardly through said bottom end wall opening into the interior of said well means and engageable by the battery contact area when the second battery end portion is operatively received in said well means.

10. The apparatus of claim 9 wherein said charging circuit means include:
    a power wiring board horizontally disposed within said housing beneath said well means, and
    said electrically conductive portion is a resiliently deflectable clip member electrically connected to said power wiring board.

11. The apparatus of claim 9 wherein:
    said well means are operative to support the battery at a vertically tilted angle of approximately 15°.

12. The apparatus of claim 9 wherein said well means have:
    a vertically tilted first side wall upon which said interior side surface is disposed,
    a generally vertical second side wall spaced apart from and facing said first side wall, and
    a horizontally spaced plurality of webs formed on said second side wall and projecting therefrom toward said first side wall, said webs being positioned to act as stops engageable by the second battery end portion to limit the vertical tilting of the battery.

13. The apparatus of claim 12 wherein:

said webs have inner side edge surfaces which are generally vertically oriented, angled relative to said second side wall, and generally parallel to said first side wall.

14. The apparatus of claim 13 wherein:

said inner side edges of said webs are upwardly sloped away from said first side wall at a slight angle.

* * * * *